May 29, 1951     W. W. COWGILL     2,554,663
METHOD OF GLOSSING PAPER
Filed Dec. 15, 1949
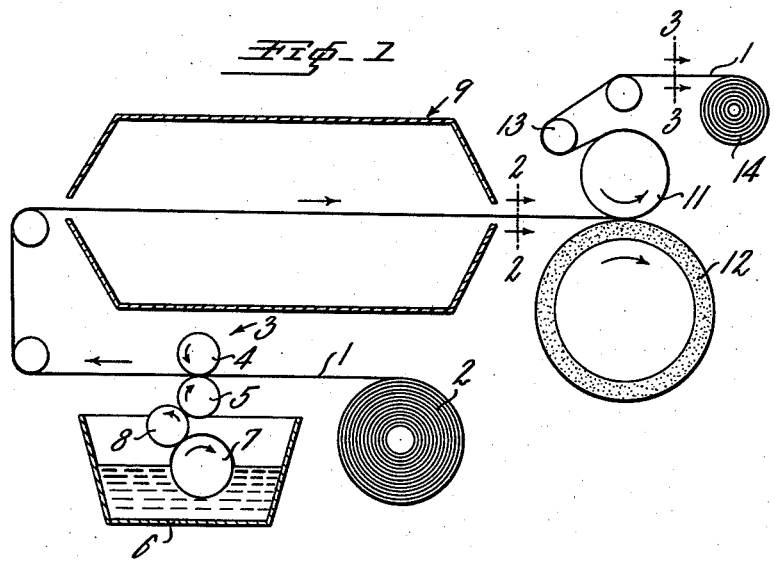
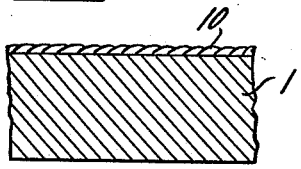
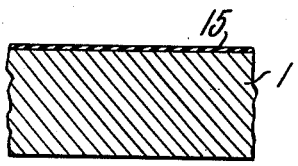
INVENTOR.
WILLIAM W. COWGILL
BY
Robert J. Patterson
ATTORNEY Patented May 29, 1951

2,554,663

UNITED STATES PATENT OFFICE 2,554,663

METHOD OF GLOSSING PAPER

William W. Cowgill, Fairfield, Conn., assignor to United States Rubber Company, New York, N. Y., a corporation of New Jersey Application December 15, 1949, Serial No. 133,183

7 Claims. (Cl. 117—65)

This invention relates to a method of continuously imparting a high gloss to paper. More particularly it relates to a continuous method of providing paper with a thin highly glossed continuous coating of solid amorphous thermoplastic polymeric material comprising resinous polymeric material which when applied in the manner herein described in detail gives a paper product having a very highly glossed finish, the gloss of which is permanent or non-fugitive and which has good flexibility, low odor or flavor, excellent adhesion to the base paper material, good appearance, reduced moisture vapor transmission, enhanced oil- and grease-resistance and good abrasion- and scuff-resistance.

At the present time there are two principal methods of providing paper with thin continuous highly glossed coatings. One method involves laminating a sheet of transparent foil to the paper under heat and pressure, but this method is extremely costly and is not adaptable to continuous high speed production, and furthermore there is a marked tendency of the applied foil layer to separate from the paper base on handling and use. A second method involves application to the paper of a solution of a thermoplastic resinous material in a volatile organic solvent followed by removal of the solvent by drying. If a still higher gloss is desired, the dried resinous coating may subsequently be heated above its melting point and allowed to flow into a partially smooth coating after which it is cooled below its solidification point. The second method is objectionable because of the great expense of the solvent, the fire hazard, the necessity of providing a solvent recovery system, and the tendency to give a film deficient in gloss. In addition there is a tendency for residual solvent to remain and impart an undesirable odor or flavor. Furthermore, there is a marked tendency for the organic solution to penetrate the paper to an objectionable extent.

The principal object of the present invention is to provide a continuous method of glossing paper with thermoplastic polymeric material comprising resinous polymeric material which method is not subject to the foregoing objections to prior art processes. Another object is to provide a method of the foregoing type adapted to high speed production. Another object is to provide a method which is sufficiently cheap that it is adapted to wide commercial utilization and that the product can be used widely. Numerous other objects of my invention will more fully hereinafter appear.

In the accompanying drawing, Fig. 1 portrays diagrammatically one arrangement of equipment which can conveniently be employed for practicing the present invention.

Figs. 2 and 3 are greatly enlarged sectional views showing the paper in process. Fig. 2 is taken on the line 2—2 of Fig. 1 and Fig. 3 is taken on the line 3—3 of Fig. 1.

I have discovered that paper can be continuously given a high gloss in a highly improved manner by applying on the surface of the paper a coating of an aqueous dispersion of an amorphous thermoplastic polymeric material comprising a substantial and preferably a major proportion of resinous polymer having a second order transition temperature between 55° C. and 125° C., drying the thus coated paper to remove the water therefrom and heating the coating, while maintaining it out of contact with any solid surface, to set the coating on the paper surface at a temperature which is from 20° C. to 60° C. higher than the second order transition temperature of the resinous polymer employed, continuously feeding the thus coated paper into the nip of a continuously rotating, heated, hard, non-resilient, mirror-finished, glossing roll and a continuously rotating resiliently surfaced roll rotating at a speed identical with the glossing roll, with the polymer-coated side of the paper web in contact with the mirror-finished roll, passing the paper web around the mirror-finished roll in intimate contact therewith for a substantial angular distance, preferably equal to at least 180°, heating the coating on the paper to a temperature, $T_g$ as defined below, while the coating is in contact with the mirror-finished roll and by means of the heat and pressure exerted causing the polymer coating to flow into a thin, highly glossed tenaciously adherent, continuous film on the surface of the paper web, continuously stripping the hot paper web at the temperature to which it has been heated from the heated mirror-finished roll by withdrawing it tangentially therefrom, and continuously passing the stripped web in a straight line from the point where it leaves the roll until the coated polymer thereon has cooled to such an extent that its gloss will not be injured by subsequent bending.

The glossing temperature, $T_g$, can vary from $T_2 + 40°$ C. $- 0.4°$ C. (P) to $T_2 + 80°$ C. $- 0.4°$ C. (P), where $T_2 =$ Second order transition temperature of the unplasticized resinous polymer in degrees centigrade, and $P =$ Percentage by weight of plasticizer present based on the sum of the unplasticized resinous polymer and the plasticizer.

The foregoing definition of $T_g$ is based upon my discovery that when the resinous polymer is used alone, i. e., without a plasticizer, the glossing temperature should range from $T_2+40°$ C. to $T_2+80°$ C., but when a plasticizer is employed with the resinous polymer the glossing temperature required for satisfactory results is lowered in direct proportion to the amount of plasticizer relative to resinous polymer. I have found that the operable glossing temperature is lowered 0.4° C. for each percent of plasticizer (based on sum of resinous polymer and plasticizer) present. Thus the presence of 25% of plasticizer lowers the glossing temperature 10° C. to a value of from $T_2+30°$ C. to $T_2+70°$ C. while the presence of 50% plasticizer lowers it 20° C. to a value of from $T_2+20°$ C. to $T_2+60°$ C.

In practice, the percentage of plasticizer used generally ranges from 5% to 50%, seldom exceeding 50%. In rare instances, as much as 55% plasticizer may be used.

By far the preferred plasticizer is a synthetic rubbery polymer which is compatible with the resinous polymer used. Such synthetic rubber has the advantage of being non-volatile and therefore permanently softening the resinous polymer, in contrast to organic liquid plasticizers which evaporate and migrate. Synthetic rubbery polymers have the further advantage of not objectionably increasing the tendency of the paper product of my invention to block. Operable synthetic rubbers include rubbery copolymers of butadiene and styrene, of butadiene and acrylonitrile, and of isoprene and styrene.

As disclosed below, I prefer to use a rubbery copolymer of butadiene and acrylonitrile as the plasticizer for a resinous copolymer of from 20 to 35% by weight of acrylonitrile and correspondingly from 80 to 65% of styrene.

The glossing temperature, $T_g$, is defined in terms of the second order transition temperature of the unplasticized resinous polymer. The second order transition temperature of the unplasticized resinous polymer can be easily determined. However it is not possible at the present time to determine the second order transition temperature of a mixture of resinous polymer and plasticizer; in fact, it may be that such a mixture cannot properly be said to have a second order transition temperature; therefore, in the case where such a mixture is applied to the paper, the glossing temperature is specified in the above manner in terms of the $T_2$ of the resinous polymer alone and in terms of the percentage of plasticizer.

The second order transition temperature of thermoplastic resinous materials is a well-known characteristic. A discussion thereof will be found in "Advances in Colloid Science" by Mark and Whitby, vol. II (Interscience Publishing Co., 1946) beginning at page 2, and also in an article by Wiley in Industrial and Engineering Chemistry, 34, 1052–1056 (September 1942). The second order transition temperature of an amorphous thermoplastic resinous material is best determined by measuring density thereof as a function of temperature. An abrupt change in the slope of the density-vs.-temperature curve defines a second order transition point. The temperature at which this occurs is called the second order transition temperature ($T_2$). Amorphous thermoplastic resinous materials display the phenomenon of going through the second order transition at which time they are believed to change from a so-called two-dimensional liquid to a three-dimensional liquid. At this point they begin to flow more readily and as the temperature is increased the viscosity goes down and the tack increases.

The drying of the coated paper web to remove the water and the heating to set the coating on the surface of the paper are usually carried out in a single step, for example, by passing the paper through a drying unit in which it is subjected to contact with a current of heated dry air to accomplish both removal of the water and setting of the coating by heating it to the specified temperature level. This setting of the coating by heating to such a level is essential in order to obtain satisfactory results in the glossing step; it secures adhesion of the particles of polymeric material to the paper surface in such a manner that they are not easily dusted or rubbed off, that picking or adhesion of the resinous material to the glossing roll is prevented thereby making continuous operation possible, and that when the resulting coating is glossed, a deep high gloss which is permanent or non-fugitive is obtained. Those skilled in the art will recognize that it is not possible to raise the temperature of the coating to above 100° C. in the drying step until substantially all of the water has been removed because an article at atmospheric pressure cannot be heated above the boiling point of water as long as it is appreciably wet with water. For this reason, where it is desired to set the resinous coating at a temperature above 100° C., all of the water must be evaporated before this temperature can be attained.

Setting of the coating within the temperature range specified above imparts certain definite and important properties to the film of polymeric material. It increases the tensile strength of the film by as much as 100%. It prevents the film from sticking to the heated polished surface during the glossing step, this effect being particularly pronounced in the case of mixtures of thermoplastic resinous polymers with rubbery copolymers such as mixtures of resinous copolymers of styrene and acrylonitrile with rubbery copolymers of butadiene and acrylonitrile. Furthermore, it changes the thermoplastic material so that it gives a permanent gloss as distinguished from a fugitive gloss such as may be attained at temperatures considerably lower than those in the specified setting range. The setting step also imparts other properties to the glossed product including increased continuity of film which results in fewer pinholes or the complete elimination of pinholes, and increased moisture vapor resistance and increased grease-proofing.

The drying and setting of the coating preparatory to the glossing step may be carried out otherwise than in a drying oven, for example, by exposure of the coated surface to radiant heat.

While the removal of water and the subsequent setting of the coating by heating can be carried out in separate steps, for example, by removing the water at a temperature below the indicated range of from 20° to 60° C. above the $T_2$ point in one step and thereafter in a subsequent step heating the coating to a temperature within said range, such separation is ordinarily undesirable because it complicates the process.

It is much preferred to dry and set the coating immediately after the coating operation because it has been found that the more quickly the coating is dried and set after coating, the higher the gloss and the lower the amount of coating required to give a given degree of gloss.

This is particularly true in the case of medium grade and poor grade paper or paper board. It is believed that this result is due to the fact that immediate drying and setting of the coating sets the coating as a surface film and prevents any large amount of absorption into the paper or paper board, which may occur if the drying and setting step is delayed any appreciable amount of time.

The length of time during which the polymeric coating is heated to from 20° C. to 60° C. above the $T_2$ point in the setting step may be very short, in fact substantially instantaneous. I have found that it is necessary to heat the coating to this temperature for an instant only and that it is not necessary to maintain it at this temperature for any great length of time. Usually I heat it at this temperature level for from 1 to 60 seconds.

The pressure exerted on the paper web as it goes through the nip of the glossing roll and the resiliently surfaced roll may vary over wide limits. I find it convenient to use a pressure within the range of from 200 to 1,500 pounds per square inch. I further find that the glossing temperature can be reduced somewhat as the pressure is increased although it will still be within the broad range specified above of from $T_2+40°$ C.$-0.4°$ C. (P) to $T_2+80°$ C.$-0.4°$ C. (P). The decrease in glossing temperature possible as the pressure is increased from 200 to 1,500 pounds per square inch generally only amounts to approximately 10° C.

Generally speaking, optimum results are obtained in the practice of my invention by using a setting temperature which is 40° C. above the $T_2$ point of the resinous polymer and a glossing temperature of $T_2+60°$ C.$-0.4°$ C. (P).

My invention is based upon the discovery that by using setting and glossing temperatures within the critical ranges given above unusually good results are obtained and it is possible to operate continuously for long periods of time, whereas if temperatures outside the critical limits given are employed, unsatisfactory results are obtained.

Any amorphous thermoplastic resinous material having a $T_2$ point of from 55° to 125° may be used in the practice of my invention. These limits are important because if the $T_2$ point is too low difficulty with blocking (solidification of a plurality of the coated sheets into a block at ordinary or moderately elevated temperatures) of the product is encountered while on the other hand if the $T_2$ point is too high, there is serious danger of injuring the product during the glossing step because of the high temperature employed in that step if the $T_2$ point is high. In the practice of my invention I employ those resinous polymers (which term as used herein includes copolymers) which are characterized as being normally hard and normally inelastic synthetic resins.

Examples of resinous polymers which may be employed in the practice of my invention are polystyrene, polyethylene, polyvinyl chloride, vinyl chloride-vinyl acetate copolymers, polymerized methyl methacrylate, or any other synthetic thermoplastic resinous polymer which exhibits the desired hardness at room temperature. The thermoplastic resinous polymer used preferably has the properties of good abrasion- and scuff-resistance, high resistance to the transmission of water vapor, low odor or flavor, good flexibility at both normal and low temperatures, high resistance to oil and grease, good adhesion to paper, low combustibility, good chemical resistance, adequate resistance to sunshine and freedom from blocking. It is often desirable to use polymeric materials which exhibit the property of heat-sealing both to themselves and to uncoated paper since this allows the coated product of my invention to be heat-sealed either to itself or to uncoated paper.

I have obtained very good results with normally hard, normally inelastic resinous thermoplastic copolymers of styrene and at least one unsaturated copolymerizable material selected from the group consisting of aliphatic conjugated dienes, especially butadiene-1,3 and acrylic nitriles having the formula

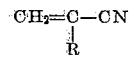

where R is hydrogen or alkyl (especially methyl, ethyl or propyl), particularly acrylonitrile, wherein the relative proportions of combined styrene and material selected from said group range between 65 and 97 per cent by weight of styrene based on the weight of styrene and said material and correspondingly between 3 and 35 per cent by weight of said material selected from said group. Typical examples of the latter type of resin are copolymers of from 80 to 97 per cent by weight of styrene and correspondingly from 20 to 3 per cent by weight of butadiene-1,3 and copolymers of from 65 to 80 per cent by weight of styrene and correspondingly from 35 to 20 per cent by weight of acrylonitrile; these two types of resin have second order transition temperatures of the order of from 60° to 85° C. and from 90° to 120° C., respectively. Instead of copolymers of styrene and only one material selected from said group, I may use ternary copolymers of styrene and both a diene and an acrylic nitrile selected from said group, such as a ternary copolymer of styrene, butadiene and acrylonitrile, the proportion of styrene being from 65 to 97 per cent and the sum of butadiene and acrylonitrile ranging from 3 to 35 per cent.

I have also obtained very excellent results using a resinous copolymer containing from 65 to 80 per cent of combined acrylonitrile and correspondingly from 35 to 20 per cent of combined isobutylene, an example of such a resin being a copolymer consisting of 70 per cent combined acrylonitrile and 30 per cent combined isobutylene and having a second order transition temperature of about 79° C.

While a resinous polymer may be the sole polymeric material in the coating, even better results are generally obtained, particularly where very high flexibility of the coating is desired, as in coating paper board to give a product particularly suitable for manufacture of folded containers wherein the glossed paper board product is sharply bent during fabrication with the result that the coating is highly stressed, by incorporating with the resinous polymer a suitable compatible rubbery copolymer. This not only markedly increases the flexibility and extensibility of the coating but also imparts higher resistance to the transmission of moisture vapor. While the relative proportions of resinous polymer and of rubbery polymer employed in such mixtures may vary widely, I prefer to employ between 50 and 95% by weight of the resinous polymer and correspondingly from 50 to 5% by weight of the rubbery polymer, these percentages being based on the sum of the two polymers. I have used as little as 45% of the resin and correspondingly 55% of the rubbery polymer, but with more than 50% of the rubbery polymer the gloss is impaired.

The amorphous thermoplastic polymeric material is employed in the form of an aqueous dispersion which may be prepared in any suitable manner. For example, the preformed resinous polymer may be dispersed in water in known manner but preferably the resinous polymer is formed as an aqueous dispersion by the emulsion polymerization of the monomeric material. The dispersion may contain any suitable emulsifying and dispersing agent. A dispersion which contains no emulsifier or similar surface active agent can be employed with perfectly satisfactory results in my invention but since it is difficult to produce a dispersion having the desired stability without an emulsifier, it is desirable to use one especially where a considerable period of time elapses between preparation of the dispersion and application thereof to the paper.

The aqueous dispersion may have any suitable concentration. Generally the proportion of dispersed resinous polymer or resinous and rubbery polymers in the aqueous dispersion will range from 25 to 60 per cent by weight and preferably from 35 to 55 per cent by weight. In general the higher concentrations are preferred because they present less water to be removed in the drying step and because they make possible the application of greater amounts of solids per unit area of the paper. However, due to the fact that the dispersions of extremely high concentration are difficult to spread on in the thin layer desired in the practice of my invention, I prefer to use dispersions having a concentration of between 35 and 55%.

In addition to the dispersed resinous polymer, or resinous and rubbery polymers, the aqueous dispersion may embody other materials such as dyes, pigments, fillers, organic liquid plasticizers, etc. While an organic liquid plasticizer for the resinous polymer may be used, it is not essential and since good results are obtained without it I prefer to omit it.

When a resinous polymer and a rubbery polymer are used in conjunction in the practice of my invention, the rubbery polymer serves as a permanent plasticizer for the resinous polymer and performs other valuable functions as well.

I have obtained unusually successful results in the practice of my invention, where very high flexibility of the glossed coating is desired, by employing an aqueous dispersion of a resinous copolymer of styrene and acrylonitrile in proportions of from 65 to 80 per cent by weight of styrene and correspondingly from 35 to 20 per cent by weight of acrylonitrile and of a rubbery copolymer of butadiene-1,3 and acrylonitrile, the relative proportions of said resinous copolymer and of said rubbery copolymer ranging from 50 to 95 per cent by weight of said resinous copolymer and correspondingly from 50 to 5 per cent by weight of said rubbery copolymer. I usually prefer to prepare such an aqueous dispersion by simply blending a latex of the resinous copolymer with a latex of the rubbery copolymer, these latices having been prepared by aqueous emulsion polymerization in well-known manner.

In a similar way, I may employ an aqueous dispersion of a resinous copolymer of butadiene and styrene in proportion of from 80 to 97% by weight of the styrene and correspondingly from 3 to 20% by weight of butadiene-1,3 and of a rubbery copolymer of butadiene-1,3 and styrene, in relative proportions ranging from 50 to 95% by weight of said resinous copolymer and correspondingly from 50 to 5% by weight of said rubbery copolymer.

The amount of the dispersion applied to the paper may conveniently be such that from 0.5 to 4 pounds of resinous polymer or resinous and rubbery polymers (on a dry basis) are applied per 1,000 square feet of paper. Thicker films (such as are obtained from applications of 2 to 4 pounds per 1,000 square feet of paper) are preferred in the case of paper board to be used in packaging because the glossed film obtained has increased moisture vapor resistance and greaseproofness. The level of solids application may vary depending upon the type of paper. Thus a denser paper with a higher finish will give a better coating with less absorption than a more porous paper with a less highly polished surface. The amount of solids applied will depend upon the amount and concentration of the dispersion and upon the gloss, moisture vapor resistance and greaseproofness desired in the product.

The thickness of the film applied to the paper in accordance with my invention may vary widely but often ranges from 0.00003" to 0.0002". A film of such thickness gives the desired protection, gloss and other characteristics desired in the coated paper and yet may be applied at low cost and, in the case of relatively thin paper, gives no difficulty with cracking or lack of flexibility even though no plasticizer or rubbery copolymer is present.

Any suitable method of coating the paper with the aqueous dispersion of the resinous polymer or resinous and rubbery polymers may be employed. Standard commercial equipment and techniques used for coating paper may be used. The coating can be effected by transfer roll, dipping, spreading or with any of the commercial coating methods now in use.

After the paper is coated, the aqueous dispersion thereupon is dried to effect substantially complete removal of the water therefrom. Ordinarily it is dried to approximately 3 per cent moisture content or less by passing the wet coated paper through a heated tunnel, oven or other types of drying equipment such as drying cylinders or drying cans of paper machines, etc.

During or subsequent to this drying operation it is necessary to heat the coating to a temperature between 20° C. and 60° C., as explained above, and preferably to a temperature between 30° C. and 50° C., higher than the second order transition temperature of the resinous polymer employed to set the particles of thermoplastic polymer on the surface of the paper in preparation for the pressing or glossing step.

If the coating is not heated to a temperature of at least 20° C. above the $T_2$ point of the resin in or following the drying step, the dispersion dries powdered, the thermoplastic material does not become tacky and is easily dusted or rubbed off the surface of the paper and does not stick to the fiber. However if the coating is heated in or after the drying step to a temperature of between 20° C. and 60° C. above the $T_2$ point of the resinous polymer, a preferred range being between 30° and 50° C. thereabove, and the optimum drying temperature being 40° C. thereabove, the polymeric material becomes tacky and in small particles sticks to the surface of the paper, cannot be dusted, rubbed or shaken off, and gives optimum results in the glossing step, as previously disclosed.

If the coating is heated prior to the glossing step to temperatures of more than 60° C. above the T₂ point in or subsequent to the drying step, the thermoplastic material becomes too fluid and is absorbed by the paper so that none, or only a very small amount, of the material is left on the surface for conversion to the desired thin continuous film in the subsequent glossing step. This absorption by the paper starts at the T₂ plus 60° C. point and increases rapidly as the temperature is raised further.

After drying and setting the coating on the paper, the paper then enters the glossing step of my process. In this step the dried coated surface is pressed against a heated solid mirror-finished surface to obtain the desired thin, highly glossed, tenaciously adherent continuous coating.

The time of exposure of the dried coated paper in the glossing step can be very short depending upon the temperature and pressure employed and other factors. I have found it necessary in this step to heat the coating to a temperature which is from $T_2+40°$ C.$-0.4°$ C.(P) to $T_2+80°$ C.$-0.4°$ C.(P), a preferred range being from $T_2+50°$ C.$-0.4°$ C.(P) to $T_2+70°$ C.$-0.4°$ C.(P) and the optimum temperature being $T_2+60°$ C.$-0.4°$ C.(P). The necessary temperature may be easily maintained by introducing steam into the mirror-finished glossing roll.

Good results can be obtained in the glossing operation only if the resinous or resinous and rubbery polymer coating has been properly set at the correct temperature as described above. If the precautions given above have been followed a continuous highly glossed coating can be obtained with an extremely small amount of material. In the case of a straight resinous polymer, if the coating is heated to too low a temperature in the setting step, a continuous surface cannot be obtained in the glossing step. In fact depending on how much below the proper temperature the coating is heated in the setting step, the surface of the product becomes poorer and poorer with merely streaks or patches of gloss here and there.

In the case of a mixture of a resinous and a rubbery copolymer, as described above, if the setting temperature is too low, sticking is encountered at the glossing temperatures described herein; while the paper may be glossed without sticking by using temperatures lower than those given herein for glossing the gloss obtained will be a fugitive gloss, i. e., will gradually disappear in a short time.

If the coating was heated in the setting step at a temperature higher than the temperature indicated above, excessive absorption of the polymer by the paper takes place in the setting step with the result that no gloss is obtained in the glossing step because little or no coating material remains on the surface to be glossed. Furthermore, the paper in which the coating material has been unduly absorbed in the setting step tends to stick to the glossing roll and cannot successfully be continuously hot stripped. Hot stripping is essential for commercial operation. By using setting and glossing temperatures in accordance with the foregoing teachings, perfect glossing of the polymer coating is obtained and the hot glossed paper can be readily stripped from the hot mirror-finished glossing roll without sticking. Temperatures below the glossing range given do not soften the polymer sufficiently with the result that it does not gloss.

Glossing temperatures above the range given cause the polymer to be excessively absorbed by the paper in the glossing step with the result that sticking of the paper to the surface of the roll occurs; such temperatures also cause deterioration of the paper or coating or both.

As previously indicated, if the setting temperature is too low, one may obtain a high gloss on glossing at the temperatures specified herein but the gloss obtained is fugitive, disappearing in a short time, typically within a week.

The paper which is glossed in accordance with my invention may be either printed or unprinted. Thus, the presence of ink on the paper does not prevent attainment of a high gloss which is uniform over both the uninked and the inked portions.

The following table lists a number of thermoplastic resinous polymers which are typical of those which may be used in accordance with my invention, together with T₂ points and optimum setting and glossing temperatures for each, when applied in unplasticized form.

| | $T_2$, °C. | Setting Temperature, °C. | Glossing Temperature, °C. |
|---|---|---|---|
| Copolymer of 85% styrene and 15% butadiene | 63 | 103 | 123 |
| Copolymer of 90% styrene and 10% butadiene | 80 | 120 | 140 |
| Copolymer of 70% styrene and 30% acrylonitrile | 94 | 134 | 154 |
| Polyvinyl chloride | 70.5 | 110.5 | 130.5 |
| Polymerized methyl methacrylate | 72 | 112 | 134 |
| Copolymer of 70% acrylonitrile and 30% isobutylene | 79 | 119 | 139 |
| Polystyrene | 72 | 112 | 132 |
| Polyethylene | 82 | 122 | 142 |

When each of the resinous polymers indicated in the foregoing table is applied in the form of an aqueous dispersion to paper in the manner described above, the wet coated paper dried, the dried coating set at the temperature indicated in the table, and the dried coated paper continuously glossed in the manner described herein at the glossing temperature indicated in the table, very excellent glossed paper results.

*Example 1*

A normally hard, normally inelastic resinous copolymer of 85% styrene and 15% butadiene, having a T₂ point of 63° C., was applied in aqueous dispersion to smooth surface calendered paper in a proportion of about 1.5 pounds of resin per 1,000 square feet of paper. After completing the coating the paper was dried and the coating set by immediately heating at a temperature of 100° C. which required about 35 seconds. The coated and dried paper was then glossed by passing it continuously into the nip of a chromium-plated mirror-finished iron roll and a hard cotton roll at a pressure of approximately 400 pounds per square inch in the nip and with the mirror-finished roll heated to a surface temperature of 140° C. The paper was held in contact with the glossing roll for 180°. The glossed paper was stripped hot from the heated chromium-plated roll in the manner described herein. The resulting coated paper had an excellent gloss.

*Example 2*

In this example, I used a resinous copolymer of 70% styrene and 30% acrylonitrile having a T₂ temperature of 94° C. I took smooth surface-calendered paper and coated it in the same manner as described in the preceding paragraph, died and set the coating at a temperature of 140° C. and subsequently glossed it in the way just described with a pressure of 400 pounds per square inch in the nip and with the chromium-plated roll heated to a surface temperature of 160° C. Paper with a very good gloss as obtained.

*Example 3*

There is first prepared an aqueous dispersion of a resinous styrene-acrylonitrile copolymer containing 70% of combined styrene and 30% of combined acrylonitrile. This dispersion is prepared by polymerizing the following recipe:

| | Parts by weight |
|---|---|
| Water | 180 |
| Styrene | 70 |
| Acrylonitrile | 30 |
| Modifier | 0.3 |
| $K_2S_2O_8$ | 0.6 |
| Duponol ME (sodium lauryl sulfate) | 3.5 |
| Daxad 11 (condensation product of formaldehyde and sodium naphthalene sulfonate) | 0.5 |

This recipe is polymerized at 50° C. for 5 to 15 hours and is then stripped, yielding a white latex having a solids (copolymer) content of 36% and a pH of 3.0 to 5.0. With this latex is admixed 0.6 part of Duponol ME and 0.6 part of Daxad 11 per 100 parts of solids content. The resulting latex is then blended with a latex of Buna N which contains approximately 43% of a copolymer of 65% butadiene-1,3 and 35% acrylonitrile, in such proportions that there is present 60% of the resinous styrene-acrylonitrile copolymer and 40% of the butadiene-acrylonitrile copolymer. The Buna N latex is prepared from the following recipe:

| | Parts by weight |
|---|---|
| Water | 140 |
| Butadiene | 65 |
| Acrylonitrile | 35 |
| Duponol ME | 3.0 |
| Benzoyl peroxide | 0.4 |
| Dodecyl mercaptan | 0.5 |

This recipe is polymerized at 40° C. for 8 hours and then at 65° C. for 5 hours. The latex is then short-stopped followed by stripping whereupon it is blended with the resin latex aforesaid.

The resulting latex blend is applied to paper at a rate corresponding to 1 pound of polymeric material per one-thousand square feet of coated surface. The coated paper is then dried at a temperature of 148° C. for 45 seconds to remove substantially all of the water and set the polymeric material, i. e., cause the polymer particles to adhere to the paper and to flow out very slightly without however merging. The thus coated paper is then passed at the rate of 60 feet per minute through the nip of a mirror-finished chromium-plated calender roll and a compressed cotton-surfaced calender roll with the coated surface of the paper in contact with the chromium-plated roll which is heated to a temperature of 120° C. The paper is allowed to pass half way around the chromium-plated roll and is then stripped therefrom by taking it off in a horizontal plane. The resulting paper has an extremely high gloss and exhibits good resistance to moisture vapor transmission. It is flexible and when sections thereof are stacked under 40 pounds per square inch pressure at 212° F. no blocking occurs. Where the paper has been printed with colored inks before applying the coating, the brilliancy of the inks is greatly enhanced by the superposition of the glossy coating and upon exposure of coated samples in the fadeometer for 7 days (which is equivalent to about 7 months in the sunlight), the extent of fading of the inks was very materially reduced, apparently because the gloss reflects the injurious light rays.

In the accompanying drawing, paper 1 is withdrawn continuously from a supply roll 2 and passed through coating device 3 which may be of any suitable type. As illustrated, coater 3 may embody an upper roll 4 and a lower roll 5 between which the web being coated passes, rolls 4 and 5 engaging the paper with suitable pressure. A reservoir 6 contains the coating bath. Roll 7 dips below the level of the aqueous dispersion in tank 6 and coats a second roll 8 which in turn coats the third roll 5 which in turn coats the paper. The use of the system shown effects application of a thin even film of the coating mixture to the lower side of the paper web 1 and enables ready control of the amount applied in a manner well known to the art.

The coated paper then passes through drying oven or tunnel 9 which effects removal of substantially all of the water and sets the coating at a temperature carefully controlled in accordance with the above teachings. The setting leaves the thermoplastic material in the form of particles 10 adhered to the surface of the paper as illustrated in Fig. 2. Usually these particles 10 tend to overlap one another as shown.

The dried paper web then passes into the nip of a hard mirror-finished glossing roll 11 and a resiliently surfaced roll 12. Roll 11 is heated internally with steam and has a chromium-plated mirror-finish. The coating is held in contact with this surface for slightly over 180°. This converts the coating to a continuous film 15. The hot glossed paper is stripped tangentially by means of stripping roll 13 and is then wound up on roll 14.

Instead of a chromium-plated mirror finish, glossing roll 11 may have a highly polished surface of any other material such as cadmium plating, nickel plating, stainless steel or even a nonmetallic material like glass or vitreous enamel provided that such other material is capable of taking and retaining a high polish. The surface should be sufficiently hard to resist scratching and abrasion and sufficiently non-resilient to resist deformation.

The glossed paper may be wound up on the product roll 14 immediately after leaving the glossing machine since if the teachings of my invention have been followed there is no problem of sticking or "blocking" of the hot finished product.

It is important that the hot paper be withdrawn tangentially from glossing roll 11 and that it move in a straight line thereafter without contact with any solid surface for a substantial distance so as to permit cooling before it is reversely bent as by roll 13. If the paper is removed in any way other than tangentially, the gloss will be injured because the thermoplastic polymer tends to adhere to the surface of the polished roll 11 to a definite extent and because the thermoplastic polymer is heated to a point above its softening point during its contact with roll 11. By removing the paper tangentially even for only a few inches before reversely curving the paper, the coating is able to set and no injury to the gloss results. This setting of the polymer is believed to occur primarily as a result of cooling to a temperature below its softening point. It is also believed that the attainment of the results described by withdrawal tangentially as shown are partially attributable to the fact that with the arrangement indicated the pressure of the paper web against roll 11 is reduced gradually rather than suddenly as would be the case if roll 13 were not spaced apart from roll 11.

Roll 12 is provided on its surface with a resilient material of any suitable type which is capable of compensating for any inequalities in the thickness of the paper web and thereby insuring that the paper web is pressed against the glossing roll 11 under uniform pressure. I prefer that the surface of roll 12 be composed of cellulosic fiber such as cotton fiber or paper highly compressed to a relatively hard but resilient surface. For example it may be a roll of the types known in the paper industry as a "cotton roll" and as a "paper roll." Such rolls are well-known in the paper industry, being described for example in vol. V of "The Manufacture of Pulp and Paper," McGraw-Hill, 1925, at pages 11 and 12 of section 3, as being made of discs of cotton or paper squeezed together under great pressure and then turned to a true cylinder. Cotton rolls are described in Perkins' Patent 861,888 as being made of discs of cotton fiber, the majority of the fibers of which are substantially radially disposed, compressed longitudinally together to a hard condition and having a smooth periphery of uniform character to which the majority of the cotton fibers are pressed endwise. Roll 12 should have a well polished truly cylindrical surface. Its surface may be brought to such a state of high polish in any well-known manner.

From the foregoing description it will be seen that the present invention provides a very satisfactory continuous method of imparting a high gloss to paper with a very small amount of resinous polymer or resinous and rubbery polymers. It will also be seen that the invention provides a simple and economical method for carrying out the continuous, high speed glossing of paper with such polymers. The process of my invention is especially satisfactory because it enables stripping of the hot glossed paper from the heated glossing surface without sticking and without the necessity of cooling the glossing surface which would render high speed production impossible. The present application is a continuation-in-part of my co-pending application, Serial Number 769,046, filed August 16, 1947. The glossed paper product is the subject matter of my co-pending application, Serial Number 54,211, filed October 12, 1948. My apparatus for glossing paper is described in more detail in my co-pending application, Serial Number 75,369, filed February 9, 1949, which is a continuation-in-part of my abandoned application Serial Number 62,117, filed November 26, 1948.

Having thus described my invention, what I claim and desire to protect by Letters Patent is:

1. A continuous process of glossing paper which comprises applying a coating of an aqueous dispersion of a resinous polymeric material selected from the group consisting of polystyrene, polyethylene, polyvinyl chloride, copolymers of vinyl chloride and vinyl acetate, polymerized methyl methacrylate, resinous copolymers of from 80 to 97 per cent by weight of styrene and correspondingly from 20 to 3 per cent of butadiene, resinous copolymers of from 65 to 80 per cent by weight of styrene and correspondingly from 35 to 20 per cent of acrylonitrile, and copolymers of from 65 to 80 per cent by weight of acrylonitrile and correspondingly from 35 to 20 per cent of isobutylene, said resinous polymeric material having a second order transition temperature ($T_2$) between 55° C. and 125° C., on the surface of the paper, drying and heating the coating at a temperature which is from 20° C. to 60° C. higher than said $T_2$ temperature and thereby removing the water from the coating and causing the polymeric material to adhere to the surface of the paper in the form of small particles constituting a discontinuous film in preparation for the subsequent glossing step, continuously feeding the resulting coated paper into the nip of a continuously rotating, heated, hard, non-resilient, mirror-finished, glossing roll and a cooperating continuously rotating resiliently surfaced roll rotating at a speed identical with the first-named roll, with the polymer-coated side of the paper web in contact with the mirror-finished roll, passing the paper web around the mirror-finished roll in intimate contact therewith for a substantial angular distance, heating the coating to a glossing temperature of from $T_2+40°$ C.$-0.4°$ C.(P) to $T_2+80°$ C.$-0.4°$ C.(P) where P is the percentage by weight of plasticizer employed in conjunction with said resinous polymerizer while said coating is in contact with said mrror-finished roll and by means of the heat and pressure exerted causing the coating to flow into a thin, highly glossed, tenaciously adherent, continuous film on the surface of the paper web, continuously stripping the hot paper web from the heated mirror-finished roll by withdrawing it tangentially therefrom, and continuously passing the stripped web immediately after stripping for a substantial distance in a straight line, while maintaining the hot coated surface out of contact with any solid surface, until the coating cools to such an extent that its gloss is not injured by bending.

2. A method as set forth in claim 1 wherein a pressure of from 200 to 1,500 pounds per square inch is exerted on the paper web as it goes through the nip of said rolls.

3. A method as set forth in claim 1 wherein the coating is maintained in contact with said mirror-finished roll for an angular distance of at least 180°.

4. A method as set forth in claim 1 wherein said resinous polymeric material is a resinous copolymer of styrene and acrylonitrile in relative proportions of from 65 to 80 per cent by weight of styrene and correspondingly from 35 to 20 per cent by weight of acrylonitrile.

5. A method as set forth in claim 1 wherein said aqueous dispersion is one of a mixture of resinous copolymer of styrene and acrylonitrile in relative proportions of from 65 to 80 per cent by weight of styrene and correspondingly from 35 to 20 per cent by weight of acrylonitrile and a rubbery copolymer of butadiene and acrylonitrile, the proportions of said copolymers ranging from 50 to 95 per cent by weight of said resinous copolymer and correspondingly from 50 to 5 per cent by weight of said rubbery copolymer.

6. A method as set forth in claim 1 wherein the amount of polymeric material applied to the surface of said paper web ranges from 0.5 to 4.0 pounds per 1000 square feet of surface.

7. A method as set forth in claim 1 wherein said aqueous dispersion is one of a mixture of said resinous polymer and a rubbery polymer compatible therewith, the proportions of said polymers ranging from 50 to 95 per cent by weight of said resinous polymer and correspondingly from 50 to 5 per cent by weight of said rubbery copolymer.

WILLIAM W. COWGILL.

REFERENCES CITED

The following references are of record in the file of this patent:

UNITED STATES PATENTS

| Number | Name | Date |
|---|---|---|
| 2,416,232 | Soday | Feb. 18, 1947 |
| 2,439,202 | Daly | Apr. 6, 1948 |

OTHER REFERENCES

Ser. No. 397,138, Fikentscher (A. P. C.), published May 11, 1943.